Feb. 26, 1924.  
J. HAMLIN ET AL  
METALLIC MOTOR VEHICLE TOP  
Filed Feb. 6, 1922

1,485,029

2 Sheets-Sheet 1

INVENTORS:  
John Hamlin,  
Toivo Makela,  
By E. J. Silvius,  
ATTORNEY.

Feb. 26, 1924.
J. HAMLIN ET AL
METALLIC MOTOR VEHICLE TOP
Filed Feb. 6, 1922
1,485,029
2 Sheets-Sheet 2
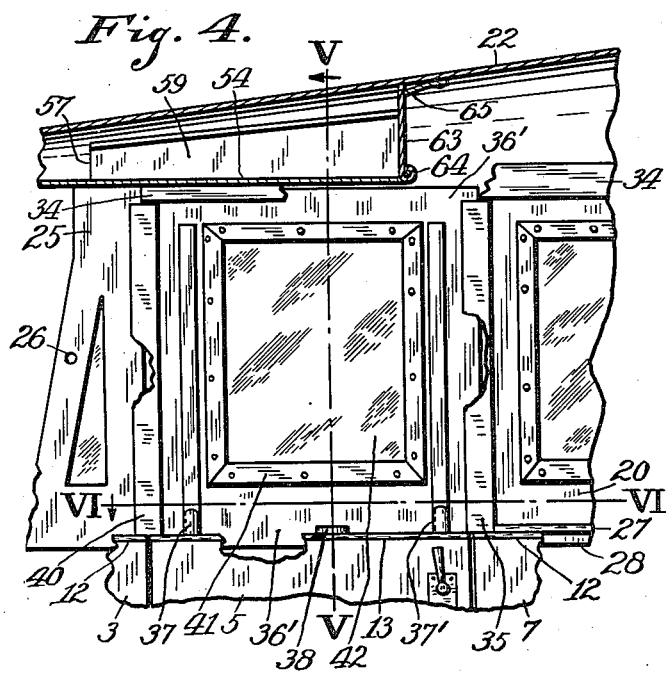
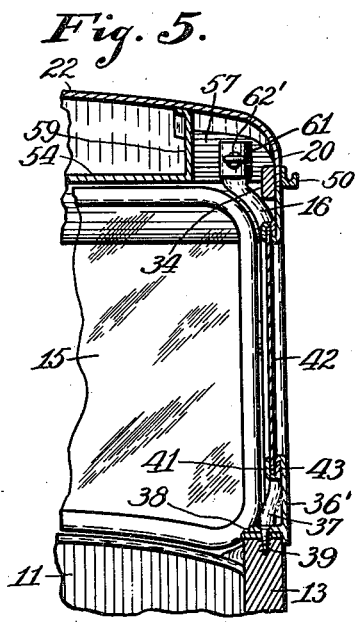
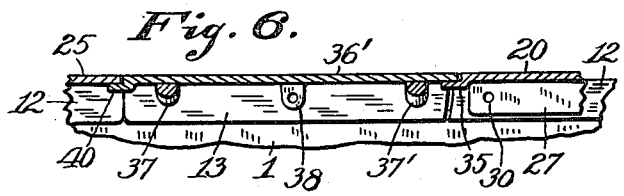
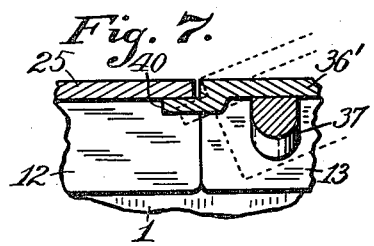
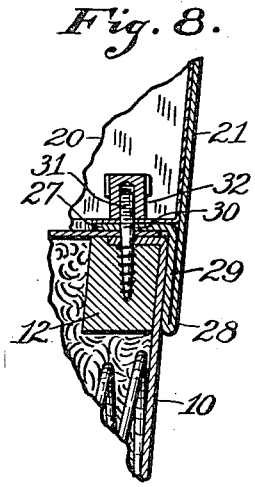
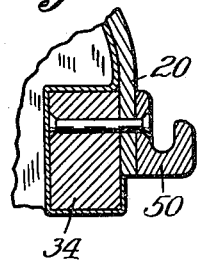
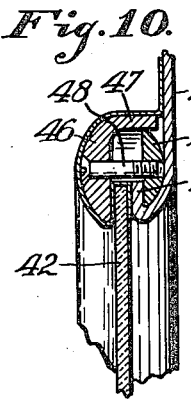
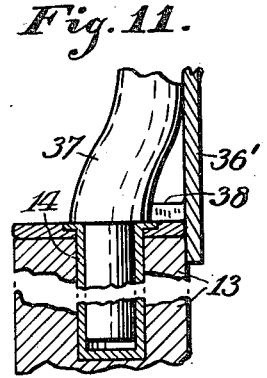
INVENTORS:
John Hamlin,
Toivo Makela,
By E.T. Silvius,
ATTORNEY.

Patented Feb. 26, 1924.

1,485,029

UNITED STATES PATENT OFFICE.

JOHN HAMLIN, OF MUNCIE, AND TOIVO MAKELA, OF INDIANAPOLIS, INDIANA.

METALLIC MOTOR-VEHICLE TOP.

Application filed February 6, 1922. Serial No. 534,411.

*To all whom it may concern:*

Be it known that we, JOHN HAMLIN, of Muncie, county of Delaware, and TOIVO MAKELA, of Indianapolis, county of Marion, State of Indiana, citizens of the United States, have invented a new and useful Metallic Motor-Vehicle Top, of which the following is a specification, reference being had to the accompanying drawings, and to the letters and figures of reference marked thereon.

This invention relates to the tops of motor vehicles of the type commonly known as touring cars, and has reference more particularly to a sheet metal top for such motor vehicles.

An object of the invention is to provide an improved metallic vehicle top which shall be adapted to be composed principally of light weight metal and yet be strong, and which may be manufactured at moderate cost.

Another object is to provide an improved metallic vehicle top which shall be so constructed as to be free from flat portions where strains are severe, and shall have arcuate portions adapted to afford stiffness where needed in a vehicle top, permitting the top to be composed mainly of aluminum or an alloy thereof.

A further object is to provide an improvd metallic vehicle top of the above-mentioned character, without the use of bows which shall be of such structure as to permit it to be manufactured of so-called aluminum of few seamless parts and so as to be readily attached to vehicle bodies, and which shall be durable and economical in use.

With the above-mentioned and other objects in view, the invention consists in a metallic motor vehicle top having various novel structural features, preferably provided with a pocket or receptacle in which to carry various articles; and the invention consists also further in the parts and combinations and arrangements of parts as hereinafter particularly described and further set forth in the accompanying claims.

Figure 1:
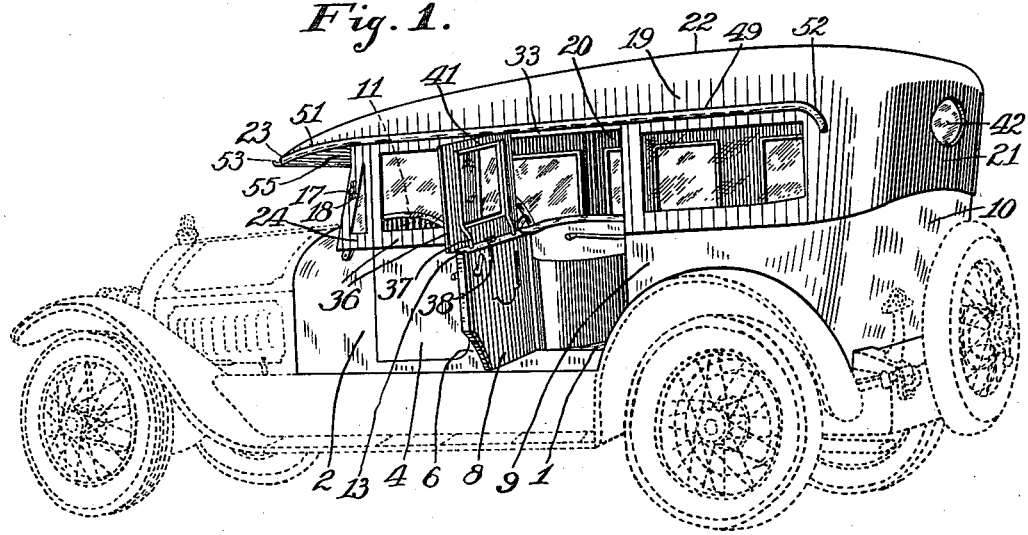
Figure 2:
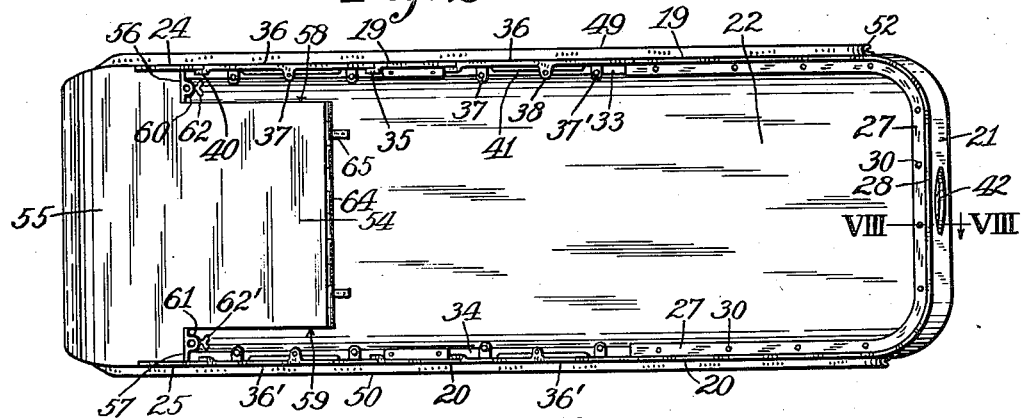
Figure 3:
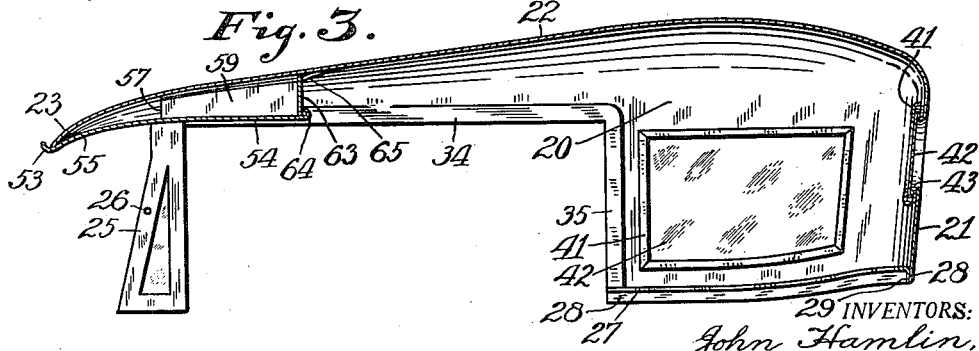

Referring to the drawings,—Figure 1 is a perspective view of the improved vehicle top and the touring car body to which the top is connected, and portions of the touring car shown by dotted lines; Fig. 2 is an inverted plan view of the improved vehicle top; Fig. 3 is a longitudinal vertical sectional elevation of the vehicle top minus the door portions thereof; Fig. 4 is a fragmentary longitudinal vertical sectional elevation of the top, on an enlarged scale; Fig. 5 is a fragmentary sectional elevation approximately on the line V—V in Fig. 4; Fig. 6 is a fragmentary section approximately on the line VI—VI in Fig. 4; Fig. 7 is a reproduction of a portion of Fig. 6, on an enlarged scale; Fig. 8 is a fragmentary vertical section approximately on the plane of the line VIII—VIII in Fig. 2, on an enlarged scale; Fig. 9 is a fragmentary detail showing portions of Fig. 5, on an enlarged scale; Fig. 10 is a fragmentary detail of window frame construction, on an enlarged scale; and Fig. 11 is a fragmentary section showing portions of door construction, on an enlarged scale.

Similar reference characters in the different figures of the drawings indicate corresponding or like elements or features of construction herein referred to in detail.

The character and advantages of the invention will be clearly understood by reference to portions of an automobile to which the invention is especially adapted to be applied. The automobile is of the type commonly known as a touring car and comprises a body floor 1 and forward portions having sides 2 and 3 to which forward doors 4 and 5 are hinged, the doors being latched to intermediate body portions 6 and 7 respectively, rearward doors 8 being hinged to the intermediate body portions. The car has also rearward body side portions 9 and a back portion 10. The instrument board 11 is arranged on the forward portions 2 and 3, as will be understood. The tops of the body portions including the forward portions 2 and 3 have top rails 12 and the doors have top rails 13. The door top rails 13 are each commonly provided with two sockets 14 whereby to carry door top standards. The touring car has a wind shield arranged between standards 16 and supported thereby by means of pivotal studs 17 provided with wing nuts 18 or other suitable clamping nuts.

The improved vehicle top comprises sheet metal sides 19 and 20, and back or rear portion 21 and a roof 22, all being connected together so that no seams are visible, being preferably composed of a single sheet of metal and having arcuate curves where the roof joins the side and rear portions, and where the rear portions join the sides, the entire roof being curved transversely and mainly so longitudinally. The roof has a downwardly curved end constituting a hood 23 which projects forward of the wind shield. The sides of the top comprise forward side members 24 and 25 that have each an aperture 26 therein to receive the adjacent pivotal stud 17, being arranged at the outer side of the wind shield standards. The sides of the top have suitable openings above the doors, and the side portions above the body portions 6 and 7 are removably connected with the upper portions of the sides, and these and the remaining portions of the sides and also the back and rear portions are provided with ledges 27 that rest upon the top rails of the body portions, the ledges being arranged slightly above the lower edge of the top portions so as to provide a lip 28 that is integral with the top side and rear portions as a guide and water shed at the outer side of the bottom rail, there preferably being a plate 29 extending integrally from the edge of the lip upward behind it and being integrally connected with the ledge. The ledges have apertures 30 therein that receive screw-threaded studs 31 which are secured to the rails 12, cap nuts 32 being connected to the studs and seated upon the ledge to secure the top in place. The sides of the top are provided on their inner sides with re-inforcing rails 33 and 34 that extend from the upper portions of the side members 24 and 25 rearward to the main portions of the sides and are connected to vertical door frame-members 35 that are arranged at the forward edge of the main portions of the sides. The rails 33 and 34 constitute top portions of the door frames against which upper door frames 36 on one side and similar door frames 36' on the opposite side of the car are stopped, each upper door frame being provided with standards 37 and 37' that are inserted in the sockets 14 of the body door; and each upper door frame is provided with an ear 38 adjacent to its bottom that is supported upon the door rail 13 and secured thereto by means of a screw 39, so that the upper door frame may be removed when desired. Each upper door frame has a lip 40 on the edge thereof that is above the hinged edge of the door and extends behind the adjacent top side member to close the joint, the opposite edge portion of the upper door frame being stopped against the frame member 35.

The sides of the top have a suitable number of window openings, of suitable size and contour, each opening being provided with a window frame 41 and a transparent plate 42 composed of glass or celluloid. Each window frame has a door portion 43 which is formed by turning over the metal of the top side or back along the window opening to support the outer side of the window glass, the metal being further turned over the edge of the glass and against the inner side of the glass.

In some cases the window frame is composed of a turned-in frame portion 44 that is pressed against a frame bar 45 arranged against the inner side of the metal of the top, the glass being placed against the portion 44, and a moulding 46 being arranged against the inner side of the glass and having a lip 47 extending over to the side of the vehicle top, a suitable number of screws 48 being inserted through the moulding and into the frame member 45.

The outer sides of the top sides 19 and 20 have gutters 49 and 50 thereon respectively that extend above the door and window openings and opposite to the rails 33 and 34 respectively, being preferably secured to the rails, each gutter having a downwardly extended forward portion 51 and downwardly extended rear portion 52, the gutters being so arranged as to receive water from the roof and conduct it away from the doorways. The forward edge of the hood 23 has a gutter 53 thereon to conduct water from the roof to either side of the vehicle.

The top is provided with a locker or receptacle for carrying various articles and it comprises a bottom 54 of suitable width and relatively broader forward portion 55 that extends under and to the side portions of the hood 23, constituting a stiffening portion of the hood, being attached to the sides 19 and 20 of the top. The receptacle has narrow rear walls 56 and 57 that extend from the side edges of the narrower bottom portion 54 to the roof and adjacent top sides, and the bottom portion 54 has sides 58 and 59 thereon that extend upward and are attached to the roof. Sockets 60 and 61 are secured to the rear walls respectively and receive the tops of the wind shield standards 16 which are secured in the sockets by means of set-screws 62 and 62' respectively. The locker is provided with a door 63 that is connected to the rear end of the bottom portion 54 by means of a hinge 64, the door extending up to the roof to which it is detachably secured by means of latches 65.

The gutters on the sides of the vehicle top not only protect the passengers from the water flowing from the roof but also stiffen the thin metal sides of the top, the gutters having considerable lateral stiffness, especially in connection with the inner rails 33 and 34, also the window frames having the outer portions formed integrally with the metal of the sides materially stiffening the thin metal sides and back portion of the top. The inner side of the top preferably has a fabric lining and obviously suitable packing for window glass provided so as to avoid contact of glass with metal. The metal of which the top is composed being non-corrosive may be bare and have a dull surface finish, or obviously may be variously coated with paint or enamel.

In practical use the metallic vehicle top retains heat for the comfort of the passengers in the cold season, and may be rendered comfortable in warm seasons by removing the door top frames and intermediate side members of the top; and the entire top may be removed from the vehicle body if desired, being of such light weight as to be easily handled. When the vehicle is in motion the top is noiseless, having no loose joints to cause noise, and it effectually protects passengers during inclement weather.

Having thus described the invention, what is claimed as new is—

1. In a metallic motor vehicle top, the combination with a vehicle body, and a wind shield at the forward portion of the body, of a top comprising a metallic roof and sides and a back connected together and to the roof, the sides and the back being secured to said body, a receptacle bottom arranged under the forward portion of said roof and extending over said wind shield and connected at its forward end to the forward end of the roof, said bottom having side walls extending up to said roof and being secured thereto, and a door hinged to the rearward end of said bottom and provided with means to latch it to said roof.

2. In a metallic motor vehicle top, the combination with a vehicle body, and a door hinged to the body, of a top secured to said body and comprising a roof and sides, each side having an opening therein to receive an upper door frame and having also a rail on the inner side thereof at the top of the opening, a metallic upper door frame having an ear on the inner side thereof and supported upon and secured to said hinged door, said door frame having a lip thereon extending to the inner side of the side of said top above the hinge of said door at one side of said opening, said door frame extending to said rail and having a window therein provided with a window frame having an outer portion composed of metal of the frame bent inward and back towards the inner side of the door frame, and an inner window frame to secure a window glass to said outer portion of the window frame.

In testimony whereof, we affix our signatures in presence of two witnesses.

JOHN HAMLIN.
TOIVO MAKELA.

Witnesses:
E. T. SILVIUS,
ROBERT LIEBRICH.